United States Patent [19]

Sukoriansky et al.

[11] Patent Number: 4,847,525

[45] Date of Patent: Jul. 11, 1989

[54] METHODS AND SYSTEMS FOR MAGNETOHYDRODYNAMIC POWER CONVERSION

[75] Inventors: Semion Sukoriansky; Leif Blumenau, both of Beer Sheva; Yechezkal E. Spero, Negev, all of Israel

[73] Assignee: Solmecs Corporation, N.V., Handelskade, Netherlands Antilles

[21] Appl. No.: 49,056

[22] Filed: May 12, 1987

[30] Foreign Application Priority Data

May 27, 1986 [IL] Israel ......................................... 78925

[51] Int. Cl.$^4$ ............................................ H02K 44/08
[52] U.S. Cl. ...................................................... 310/11
[58] Field of Search .......................................... 310/11

[56] References Cited

FOREIGN PATENT DOCUMENTS 1763012 7/1971 Fed. Rep. of Germany ........ 310/11
197712 12/1977 U.S.S.R. ................................. 310/11

Primary Examiner—Patrick R. Salce
Assistant Examiner—Judson H. Jones
Attorney, Agent, or Firm—Sughrue, Mion, Zinn, Macpeak and Seas

[57] ABSTRACT

There is provided a method for wet-vapor, liquid-metal magnetohydrodynamic power conversion. The method includes partially boiling off, using at least a heat source, an electrically conductive, substantially single-phase working liquid, thus generating vapors which, together with the still liquid phase, produce a two-phase mixture, extracting electric power by passing the two-phase mixture through a two-phase MHD generator, causing the vapor phase of the two-phase mixture from the MHD generator to condense, by mixing in a condenser the two-phase stream exiting from the MHD generator with a stream of subcooled liquid metal, splitting the liquid exiting the condenser into a first part and a second part, returning the first part to the heat source to be reheated, subcooling the second part by passing it through a heat-exchanging means, accelerating the subcooled liquid metal to substantially match the velocity of the two-phase mixture in the condenser, and introducing the accelerated and subcooled liquid metal into the condenser to effect the condensing action. There is also provided a system for wet-vapor, liquid-metal magnetohydrodynamic power conversion.

35 Claims, 8 Drawing Sheets

METHODS AND SYSTEMS FOR MAGNETOHYDRODYNAMIC POWER CONVERSION

BACKGROUND OF THE INVENTION

The present invention relates to methods and systems for liquid-metal magnetohydrodynamic power conversion, especially applicable for use in installations working in the wet-vapor regime, in particular for mixer- and separator-less liquid-metal magnetohydrodynamic power conversion.

The large majority of the concepts of Liquid Metal Magneto-Hydro-Dynamic (LMMHD) Power Conversion Systems (PCSs) proposed so far call for the use of, among other things, a two-component, immiscible fluid system, a mixer and a separator. The two-component fluid consists of a mixture of an electrodynamic fluid—usually a liquid metal, and a thermodynamic fluid—usually a gas (such as helium) or dry vapor (such as dry steam). The thermodynamic fluid expands nearly isothermally (due to its being in direct contact with the liquid metal, which has a relatively large heat capacity) into a lower pressure regime, carrying along with it the electrodynamic fluid. If the thermodynamic fluid is of the volatile type, expansion takes place in the superheated vapor regime. These processes lead, to the conversion of thermal energy into electricity in a two-phase MHD generator. After expansion in the MHD generator, the thermodynamic fluid is separated (in the separator) from the electrodynamic fluid (in several concepts, separation takes place upstream of the MHD generator), is cooled, compressed back to the high pressure of the cycle, heated back to the high temperature of the cycle, mixed (in the mixer) with the electrodynamic fluid, thus completing the cycle.

One drawback of the LMMHD PCSs based on the use of the conventional two immiscible component fluid system is the need for a mixer and, particularly, of a separator. The latter component is not only liable to lead to a significant loss in efficiency, but is complicated to design particularly for space (i.e., zero gravity) applications. Another drawback of these LMMHD PCSs is that they cannot match well a power system which provides its energy over a wide temperature range; the near isothermal expansion can only take place at a temperature significantly below the upper temperature of the heat source, thus limiting cycle efficiency.

A single-component LMMHD PCS is known which requires no mixer or separator. This system uses a "condensing-injector" in which the condensation of the vapor is achieved by injecting a sub-cooled liquid into the two-phase mixture prior to entering the MHD generator. In the condensing injector, the vapor is condensed and a high-stagnation head liquid is generated. The liquid passes through a single-phase MHD generator, where electric energy is generated at the expense of the stagnation pressure head. The performance of this cycle is determined essentially by the performance of the condensing injector. Unfortunately, several studies have shown that this device has an inherently low internal efficiency due, primarily, to the fact that the streams of vapor and liquid enter it at significantly different velocities; the encounter of two such streams is associated with a significant loss of kinetic energy. After a number of theoretical and experimental studies carried out both in the United States and in the USSR indicated that the efficiency of the condensing injector and, therefore, of the cycle based on this device, was too low to be of practical interest, all further research on condensing-injector-based PCSs was abandoned in the late sixties.

In none of the other PCSs designed to have a jet condenser was there an attempt to match the velocities of the subcooled liquid and the vapor or two-phase stream.

Another prior-art system proposes using a two-component, separator-less LMMHD PCS. The two-component fluid consists of a liquid metal for the electrodynamic fluid, and an organic liquid for the thermodynamic fluid. Upon heating, the organic liquid vaporizes to form a two-phase, high-pressure mixture. The organic fluid vapors expand to the low pressure of the cycle, carrying with them the liquid metal through the MHD generator to produce electricity. At the low pressure part of the cycle the mixture is cooled, thus causing the organic fluid vapor to condense and form a single liquid phase. After being pumped to the high pressure of the cycle, the mixture is heated up to completely vaporize the organic fluid to provide the desirable void fraction. Subsequent expansion of the fluid takes place in the superheated vapor regime. As the liquid metal and organic fluids are immiscible, special mixers need be installed in the system to ensure a homogeneous mixture.

A common limitation of the LMMHD PCSs which use a two-phase MHD generator is that the maximum gas or vapor volume fraction in the cycle is less than about 85%; at higher void fractions conductivity of the two-phase mixture starts to drop, thus impairing the efficiency of the MHD generator. Had there been no loss in conductivity, the higher the cycle maximum void fraction, the higher could be the expansion pressure ratio and the efficiency attainable from a given stage of LMMHD PCS.

Two approaches enabling to increase the maximum void fraction attainable in the expansion of the two-phase mixture in LMMHD PCSs have been proposed. One approach is to add to the working fluid so-called surfactants, i.e., surface-tension reducing additives. These additives promote foaming which enables expanding the two-phase mixture in the MHD generator channel to a much higher exit void fraction than otherwise possible without loss in MHD generator efficiency. As foaming interfers with the separation of the gaseous phase from the liquid phase, it is only practical in LMMHD PCSs which are separator-less.

Another approach proposed to obtain higher void fractions than attainable in MHD generators is to allow the working fluid to continue the expansion process in a nozzle installed downstream of the generator. The extra conversion of thermal-to-kinetic energy thus achieved can be turned into a pressure head in a diffuser to follow the nozzle. To make this process efficient, though, it is necessary to separate the vapor from the two-phase mixture exiting the nozzle, to enable the use of a liquid diffuser. However, the separation process in itself introduces losses in efficiency and complicates design.

SUMMARY OF THE INVENTION

It is one of the objects of the present invention to overcome some of the disadvantages and deficiencies of prior-art LMMHD PCSs and, by combining the benefits of, e.g., two-phase LMMHD generators, nozzles diffusers and jet condensers in a novel way, to provide an LMMHD PCS that is an improvement upon prior-art LMMHD PCSs, inasmuch as it presents the following features:

BRIEF DESCRIPTION OF THE DRAWINGS

A highly efficient way of using a jet condenser;

Expansion of the working fluid is nearly isentropic, therefore no regenerative heat exchangers are required;

Figure 1:
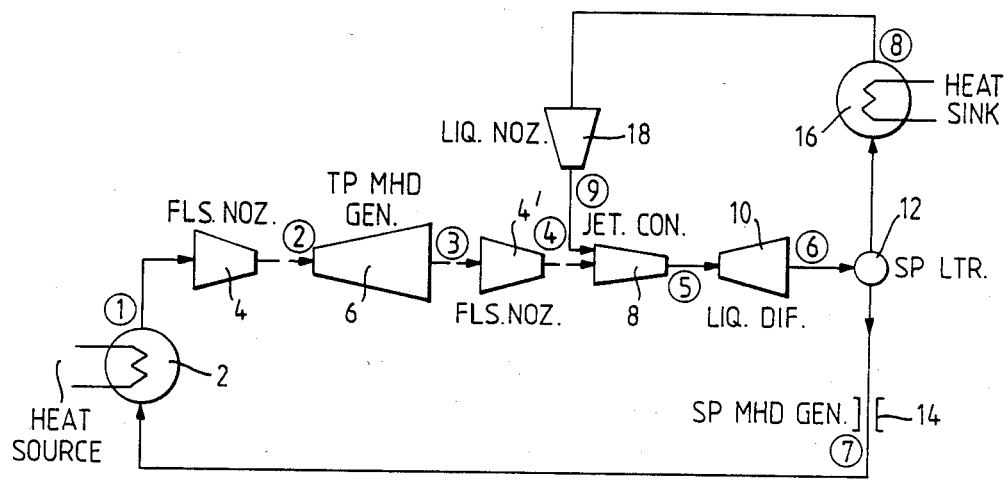

No need for either mixers or separators;

Expansion of the working fluid to extremely high vapor volume fractions, thus utilizing a larger fraction of the thermal energy of the working fluid than possible without foaming and without a nozzle-diffuser;

Avoidance of excessive friction or kinetic energy losses resulting from high flow velocities;

Interfacing to the heat sink as well as to the heat source using a liquid-metal (rather than a two-phase fluid) heat exchanger;

Providing a good match (characterized by a small exergy loss) to heat sources characterized by power delivery over a relatively wide temperature range.

This, the present invention achieves by providing a method for wet-vapor, liquid-metal magnetohydrodynamic power conversion, comprising, in a cyclic process:

partially boiling off, using at least a heat source, an electrically conductive, substantially single-phase working liquid, thus generating vapors which, together with the still liquid phase, produce a two-phase mixture;

extracting electric power by passing said two-phase mixture through a two-phase MHD generator;

causing the vapor phase of said two-phase mixture from said MHD generator to condense, by mixing in a condenser, the two-phase stream exiting from said MHD generator with a stream of subcooled liquid metal;

slitting said liquid exiting said condenser into a first part and a second part;

returning said first part to said heat source to be reheated after partially reheating it in the regenerator heat exchanger used for subcooling the liquid exiting from the first liquid diffuser.

subcooling said second part by passing it through a heat-exchanging means;

accelerating said subcooled liquid metal to substantially match the velocity of said two-phase mixture in said condenser, and introducing said accelerated and subcooled liquid metal into said condenser to effect said condensing action.

The invention also provides a method for wet-vapor, liquid-metal magnetohydrodynamic power conversion, comprising, in a cyclic process:

partially boiling off, using at least a heat source, an electrically conductive, substantially single-phase liquid, thus generating vapors which, together with the still liquid phase, produce a two-phase mixture;

extracting electric power by passing said two-phase mixture through a first two-phase MHD generator;

causing the vapor phase of said two-phase mixture to partially condense by mixing, in a condenser, the two-phase mixture exiting from said MHD generator with a stream of subcooled liquid;

extracting electric power by passing the partially condensed two-phase mixture through a second two-phase MHD generator;

finally and fully condensing the vapor phase of the two-phase mixture exiting from said second MHD generator by passing it through a heat-exchanging means;

splitting the subcooled single-phase liquid exiting said heat-exchanging means into a first part and a second part;

returning said first part to said heat source to be reheated;

accelerating said second part by passing it through an accelerating means, and introducing said accelerated and subcooled liquid metal into said condenser to effect said partial condensing action.

The invention further provides a method for wet-vapor liquid-metal magnetohydrodynamic power conversion, comprising, in a cyclic process:

partially boiling off, using at least a heat source, an electrically conductive, substantially single-phase working liquid, thus generating vapors which, together with the still liquid phase, produce a two-phase mixture;

extracting electric power by passing said two-phase mixture through a first two-phase MHD generator;

causing the vapor phase of said two-phase mixture from said MHD generator to partially condense by passing said mixture through a regenerative heat exchanger;

extracting electric power by passing said partially condensed two-phase mixture exiting from said regenerative heat exchanger through a second two-phasse MHD generator, finally and fully condensing the vapor phase of said two-phase mixture by passing it through a heat sink, and returning the subcooled single-phase liquid exiting from said heat sink to said heat source via said regenerative heat exchanger to exchange heat with said two-phase mixture to be partially condensed therein.

There is also provided a method for wet-vapor liquid-metal magnetohydrodynamic power conversion, comprising, in a cyclic process:

partially boiling off, using at least a heat source, an electrically conductive, substantially single-phase working liquid, thus generating vapors which, together with the still liquid phase, produce a two-phase mixture;

extracting electric power by passing said two-phase mixture through a two-phase MHD generator;

causing the vapor phase of said two-phase mixture exiting from said MHD generator to condense, by passing said mixture through a heat sink, and returning the single-phase liquid exiting from said heat sink to said heat source.

In accordance with another aspect of the invention there is provided a system for wet-vapor, liquid-metal magnetohydrodynamic power conversion, comprising:

a heat source for converting an electrically conductive, substantially single-phase working liquid into a two-phase mixture;

a two-phase MHD generator for extracting electric power from said two-phase mixture;

a condenser for condensing the vapor phase of said two-phase mixture from said MHD generator;

a splitter for dividing the liquid metal exiting from said condenser into a first and a second part;

a heat-exchanging means for subcooling said second part, and means for accelerating said subcooled liquid metal prior to its introduction into said condenser.

The invention further provides a system for wet-vapor, liquid-metal magnetohydrodynamic power converson, comprising:

a heat source for converting an electrically conductive, substantially single-phase working liquid into a two-phase mixture;

a two-phase MHD generator for extracting electric power from said two-phase mixture;

a condenser for partially condensing the vapor phase of said two-phase mixture exiting from said MHD generator;

a second two-phase generator for extracting electric power from said partially condensed two-phase mixture;

a heat-exchanging means for finally and fully condensing and subcooling the partially condensed two-phase mixture exiting from said second MHD generator, and a splitter for dividing the liquid metal exiting from said heat-exchanging means into a first and a second part.

There is still further provided a system for wet-vapor, liquid-metal magnetohydrodynamic power-conversion, comprising:

a heat source for converting an electrically conductive, substantially single-phase working liquid into a two-phase mixture;

a first two-phase MHD generator for extracting electric power from said two-phase mixture;

a regenerative heat exchanger for partially condensing the vapor phase of said two-phase mixture exiting from said first MHD generator;

a second two-phase MHD generator located downstream of said regenerative heat exchanger, and a heat-exchanging means for finally and fully condensing the vapor phase of said two-phase mixture, from which heat sink the single-phase liquid metal exiting therefrom is returned via said regenerative heat exchanger to said heat source.

There is finally provided a system for wet-vapor, liquid-metal magnetohydrodynamic power conversion, comprising, in a first stage:

a heat source for converting an electrically conductive, substantially single-phase working liquid into a two-phase mixture;

a two-phase MHD generator for extracting electric power from said two-phase mixture;

a heat sink for condensing the vapor phase of said two-phase mixture exiting from said MHD generator, from which heat sink the single-phase liquid metal exiting therefrom is returned to said heat source.

Specifically, the present invention uses a jet-condenser of different design characteristics than the prior-art jet condenser (or "condensing-injector") mentioned above, which mixes a high-velocity vapor with a low-velocity subcooled liquid, while the jet-condenser of the present design brings together the two-phase mixture and the subcooled single-phase liquid in co-directional axial streams of substantially equal velocity. This match is directional velocities makes the jet-condenser used in the present invention to be of significantly higher efficiency than known jet condensers.

It should be understood that the noun "liquid" or "fluid" as used hereinbelow is intended to cover:

(1) a single-component liquid metal;
(2) a two-component liquid, comprising a substantially immiscible mix of a low vapor pressure component and a high vapor pressure component;
(3) a composite liquid, comprising a solution of two or more liquid metals.

Any one of these liquids could include surface-tension reducing additives to provide foaming.

It should also be noted that ringed numerals appearing in the schematic drawings are datum-point numerals which refer to the associated T-S diagrams.

It is further pointed out that the term "module" is used for staged systems (e.g., FIGS. 6 or 10) in which each stage consists of a separate, independent working-fluid cycle.

The invention will now be described in connection with certain preferred embodiments with reference to the following illustrative figures so that it may be more fully understood.

Figure 7:
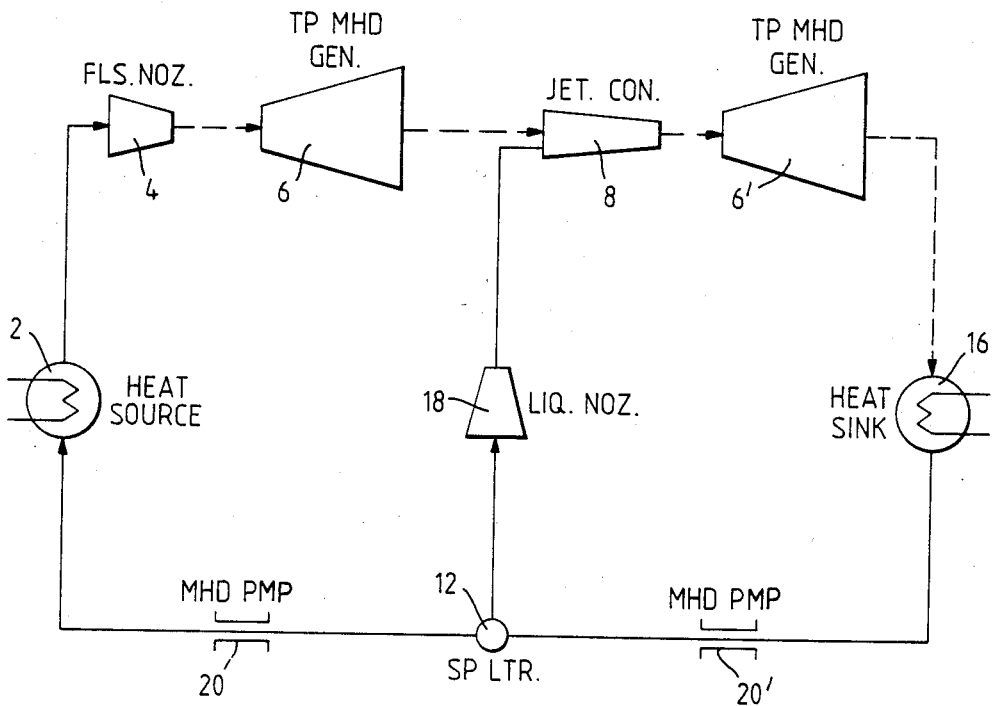
Figure 2:
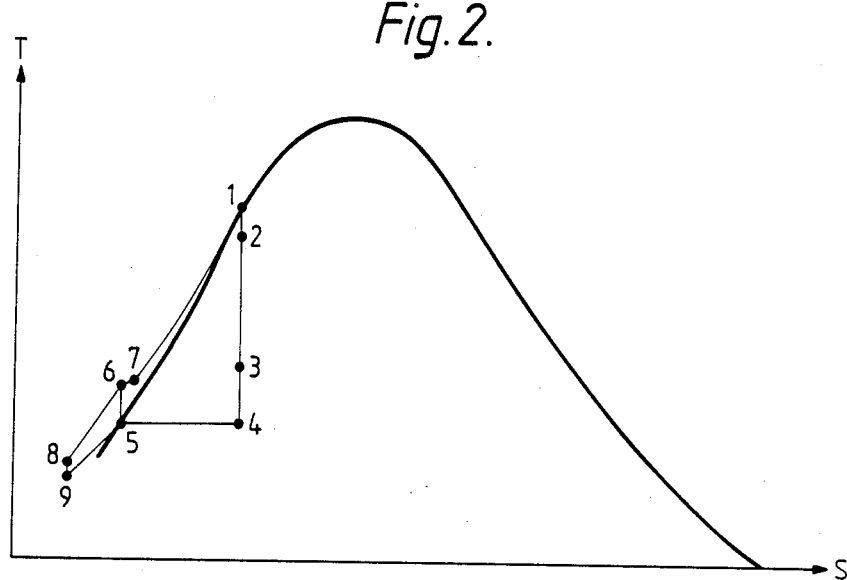
Figure 3:
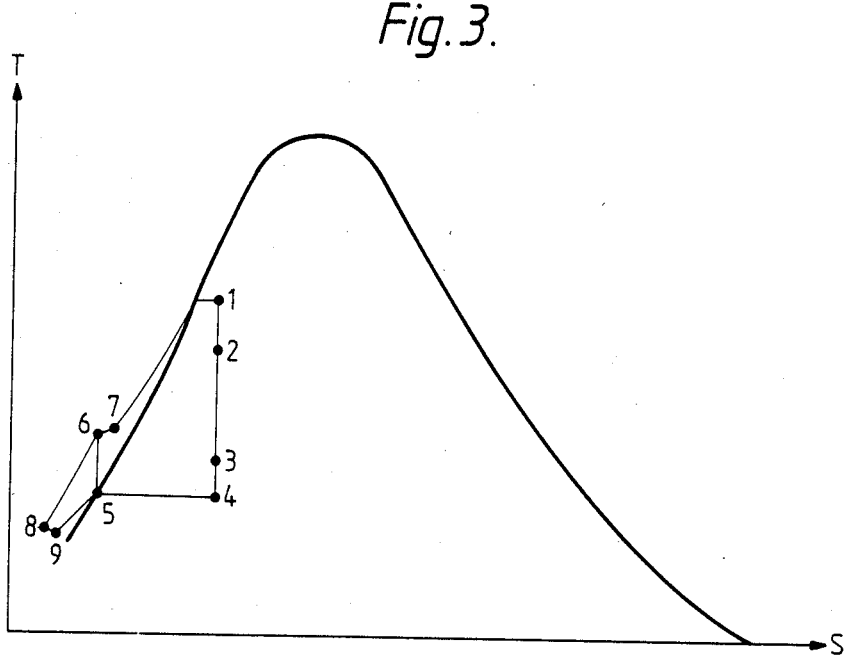
Figure 4:
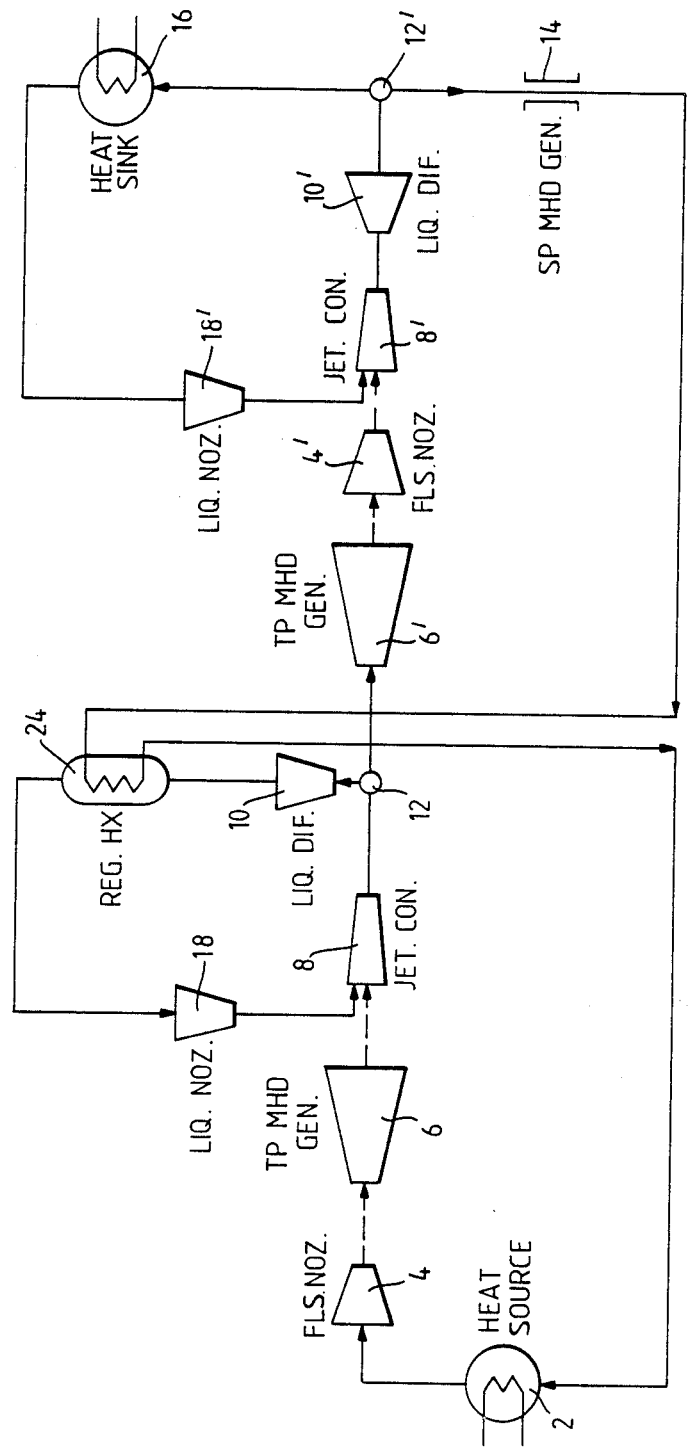
Figure 5:
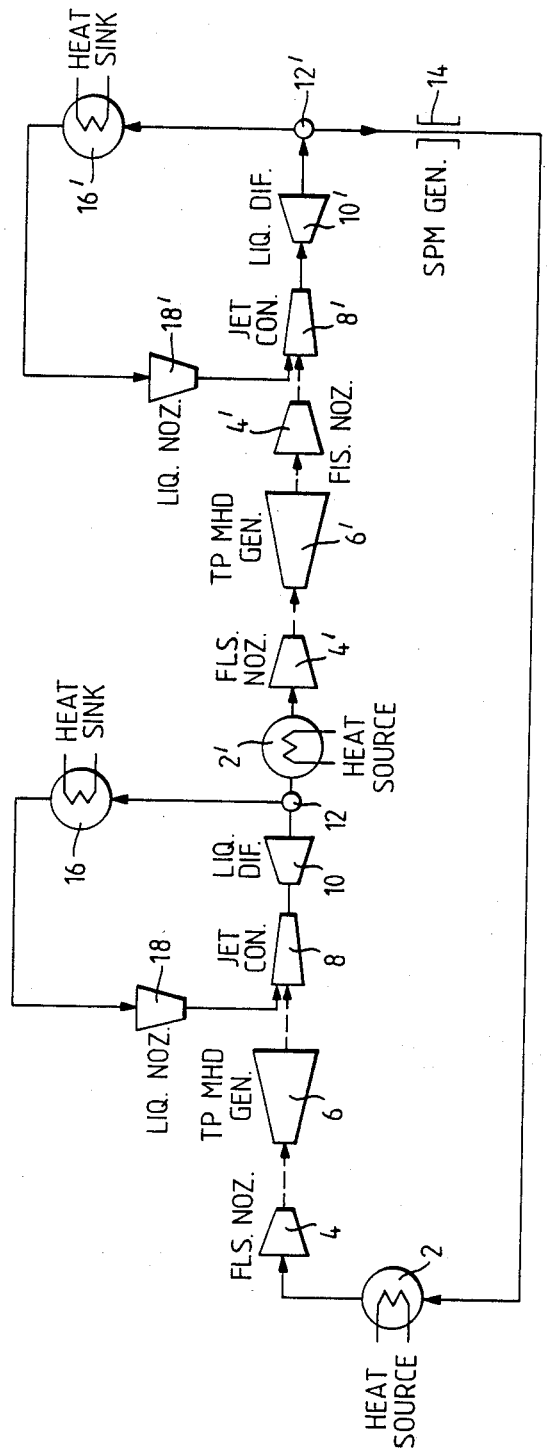
Figure 6:
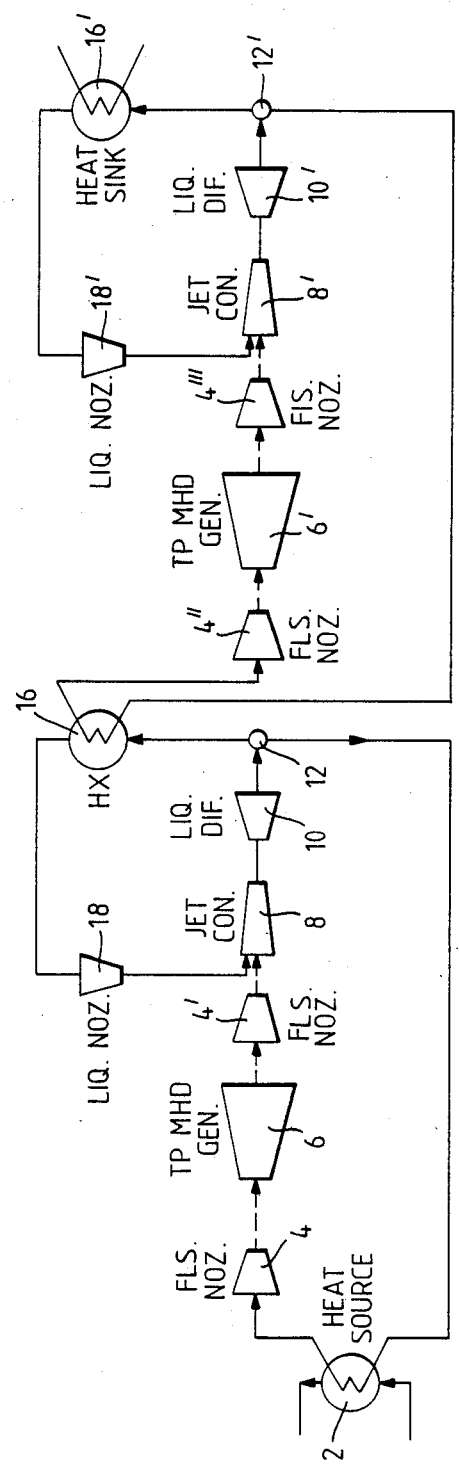
Figure 8:
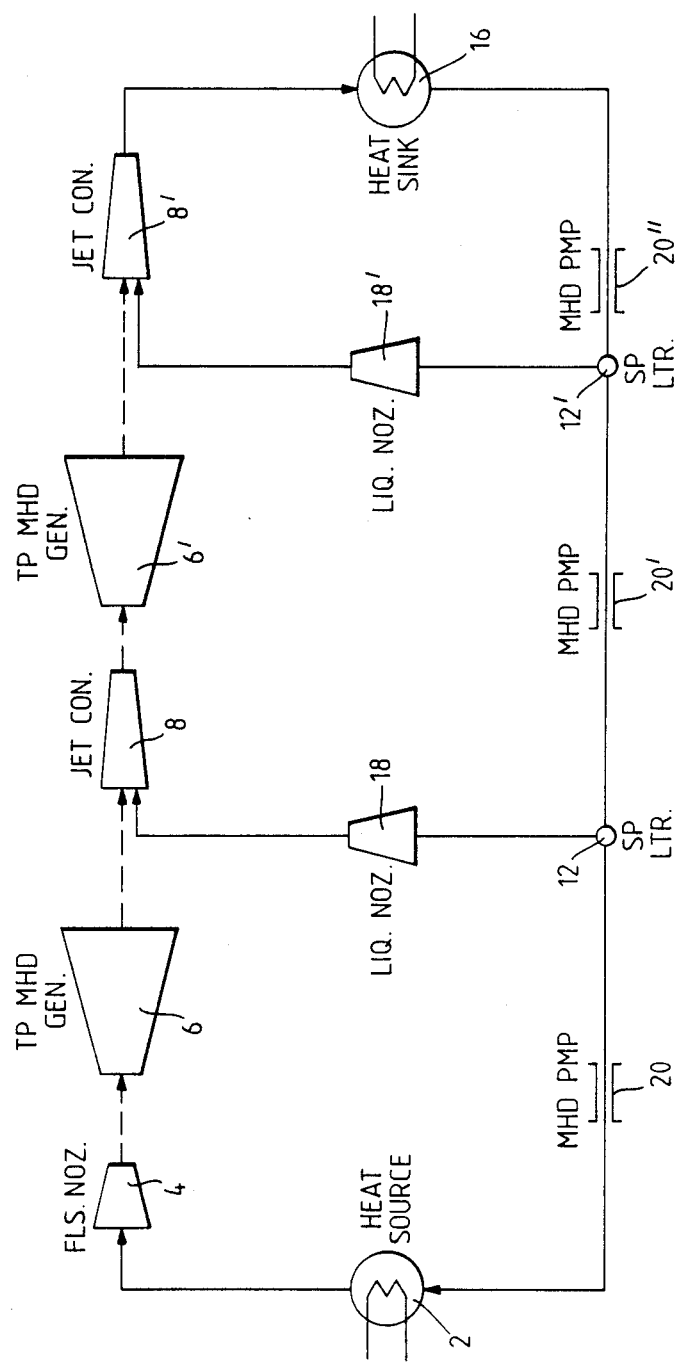
Figure 9:
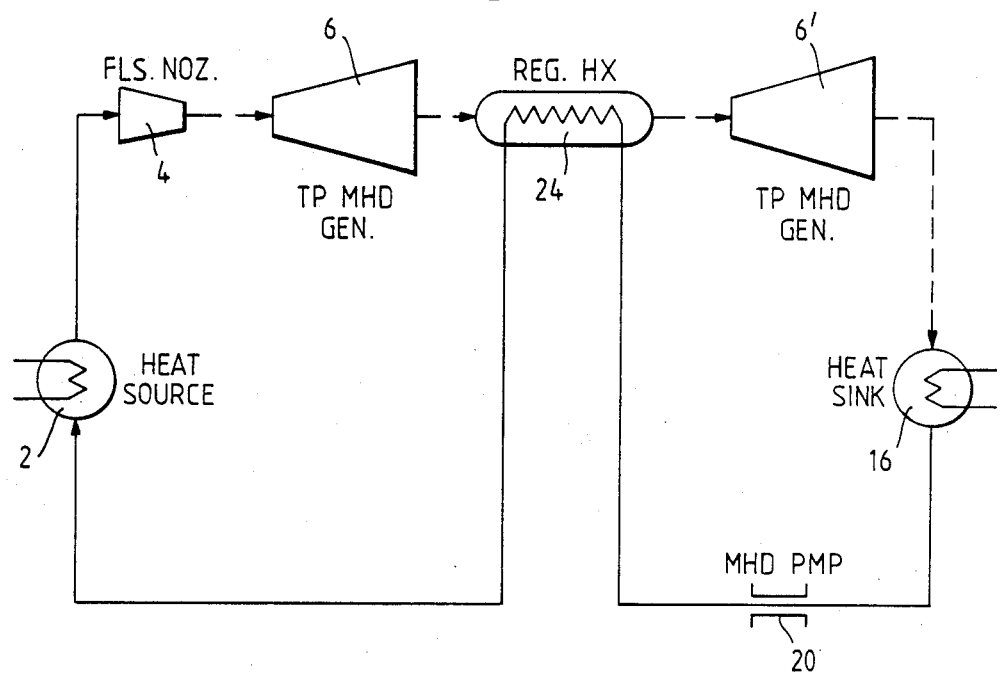
Figure 10:
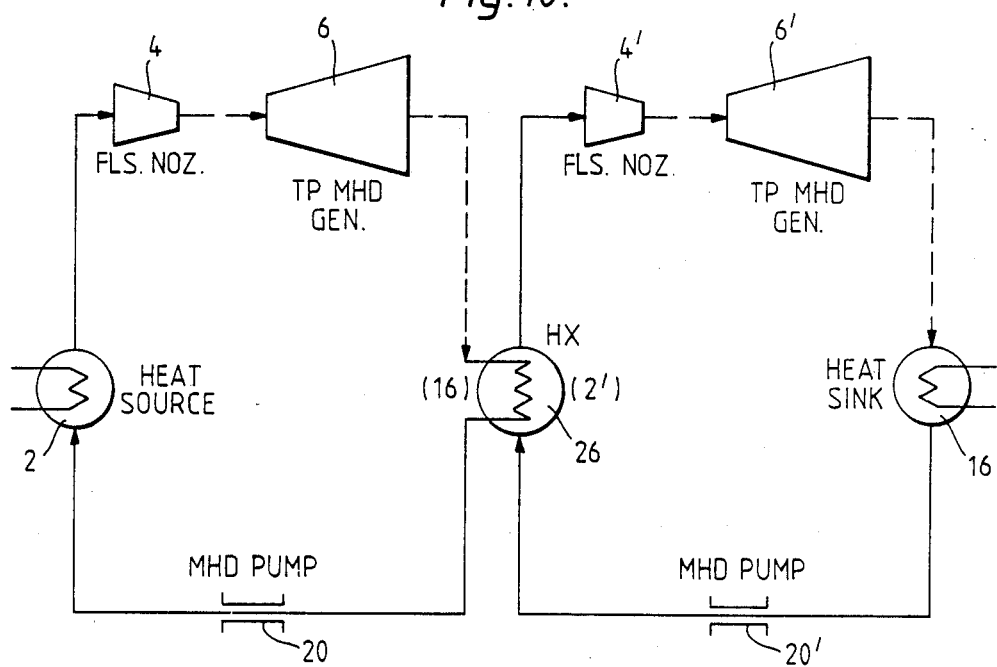
Figure 11A:
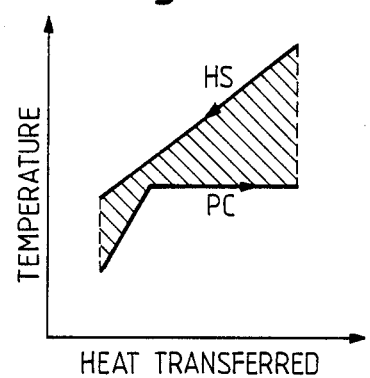
Figure 11B:
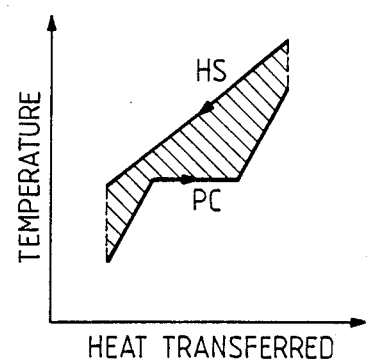
Figure 11C:
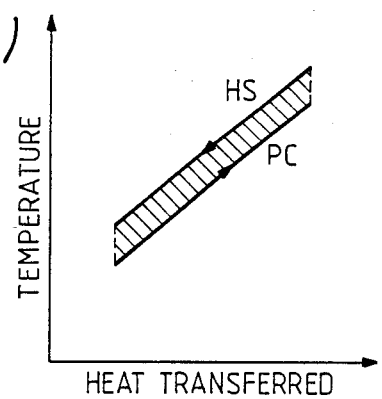
Figure 12A:
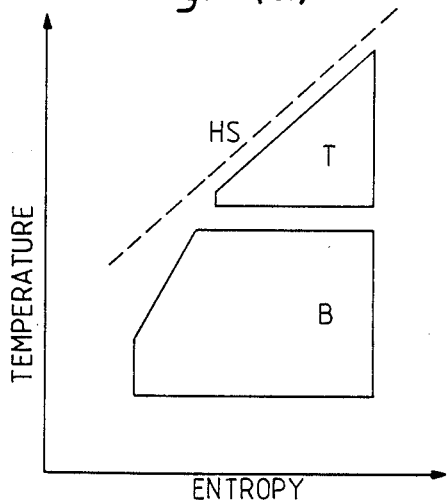
Figure 12B:
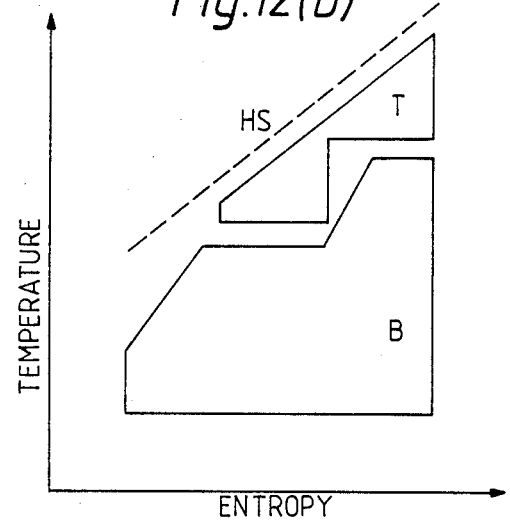

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 1 is a schematic illustration of a basic embodiment of the present invention;

FIG. 2 is the T-S diagram of the embodiment of FIG. 1;

FIG. 3 represents the T-S diagram of a variant of the embodiment of FIG. 1, in which the working liquid is made to partially boil by the heat source;

FIG. 4 is a schematic illustration of a multi-stage power LMMHD conversion system (PCS) according to the invention;

FIG. 5 represents another such cycle;

FIG. 6 illustrates way of coupling two LMMHD PCS modules in series;

FIG. 7 schematically illustrates a dual-stage LMMHD PCS in which the jet condenser only partially condenses the two-phase fluid;

FIG. 8 shows a similar arrangement, which has a second jet condenser;

FIG. 9 is a schematic representation of an embodiment of the invention using a regenerative heat exchanger instead of the jet condenser;

FIG. 10 schematically represents a dual-module LMMHD PCS in which the heat sink of one module serves as heat source of the following module;

FIGS. 11a–11c illustrate heat transfer from heat source to working liquid of some prior art PCSs (a, b) as compared to that of the LMMHD PCS according to the preesnt invention (c), and FIGS. 12a and 12b illustrate the matching capabilities, as topping cycles, of the PCSs according to the present invention.

DETAILED DESCRIPTION OF THE PREFERRED EMBODIMENTS

Referring now to the drawings, there is seen in FIG. 1 a schematic illustration of an LMMHD PCS embodying the present invention. This PCS is aimed at converting thermal power provided by the heat source 2 into electricity. It comprises a flash nozzle (FLSNOZ) 4 connected to a two-phase MHD generator (TPMHDGEN) 6 which is connected to a second FLSNOZ 4' which is connected to a condenser 8, advantageously a jet condenser (JETCON), which is followed by a liquid diffuser (LIQDIF) 10. The liquid leaving the LIQDIF 10 is being divided in the splitter (SPLTR) 12 into two streams; the "power" stream and the "coolant" stream. The "power" stream may pass through a single-phase MHD generator (SPMHDGEN) 14 prior to returning to the heat source 2. The "coolant" stream passes through a heat-exchangng means in the form of the heat sink 16 of the cycle into the JETCON 8 via a liquid nozzle (LIQNOZ) 18. There exists the option of using a pump (MHD or mechanical) if pressure in one of the streams is insufficient to provide circulation. Of course, on the power stream, an excess or lack of pressure may be compensated for by the use of a SPMHD generator or a pump respectively.

The operation of the power cycle, the T-S diagram of which is illustrated in FIG. 2, is as follows: An electrically conductive liquid, advantageously a liquid metal which has a high enough vapor pressure at the high temperature of the cycle, e.g., mercury or cesium, or potassium, possibly including a surface-tension reducing additive, passes through the heat source 2 where it is heated to the high temperature of the cycle, which is close to its boiling point. The heat source can, in principle, be of any type providing the right temperatures, including fission reactors, fusion reactors, solar energy devices, as well as fossil-fired power plants. The heating of the LM can be done directly, with the liquid metal being the primary coolant of the heat source, or indirectly, in which case the primary coolant transfers its heat to the PCS working fluid via a heat exchanger.

As the LM passes through the flash nozzle 4, it gains velocity, loses pressure and starts boiling, thus turning into a two-phase mixture. The two-phase flow passes through an MHD generator (TPMHDGEN) 6 in which it continues to flash and which is designed to have an exit vapor volume fraction below the value that will cause a significant drop in the electrical conductivity of the two-phase mixture. Exiting from the TPMHDGEN 6, the two-phase mixture advantageously passes through a flash nozzle 4', where its velocity and vapor volume fraction increase, the latter reaching or exceeding 95%.

The hot two-phase stream is mixed, in the jet-condenser 8, with a co-directional stream of subcooled liquid metal of substantially identical velocity and pressure, causing the metal vapors to condense without losing much kinetic energy. The resulting single-phase high-velocity liquid metal passes through a diffuser 10, where its velocity declines, while its pressure builds up.

While the jet condenser 8 shown in the drawings is aimed at providing some additional acceleration upstream, and consequently bringing some pressure increase downstream, of the diffuser 10, it is possible to get part or all of the pressure increase necessary using a pump in the subcooled liquid-metal cycle.

The liquid metal leaving the LIQDIF 10 is split, with the main stream going (possibly via a single-phase MHD generator 14) back to the heat source 2. The other stream passes through the heat sink 16, where it is subcooled. From there the subcooled liquid is accelerated in the LIQNOZ 18 where, furthermore, its velocity and pressure are being adjusted, to match the velocity and pressure of the two-phase fluid. A liquid nozzle is of course only one possible, although because of its simplicity preferred, means to this end.

In this cycle the thermal energy of the LM coming out of the heat source 2 (see FIGS. 1 and 2) is converted to kinetic energy in the FLSNOZ 4, to electrical energy in the TPMHDGEN 6, and to additional kinetic energy in the second FLSNOZ 4'. The kinetic energy is then converted back to pressure in the LIQDIF 10. Part of this pressure may be utilized for additional electricity generation in a single-phase MHD generator 14, while the rest of this pressure is used to overcome the pressure drops in the cycle, and to maintain the high pressure of the cycle without need for either MHD or mechanical pumps.

Notice that the use of the TPMHDGEN 6 upstream of the second FLSHNOZ 4' prevents the establishment of excessively high velocities, thus reducing friction losses as well as erosion problems. Also, the use of similar velocities for the subcooled LM and two-phase streams entering the JETCON 8 minimizes kinetic energy losses.

The above described cycle has a trapezoidal shape in the T-S diagram (FIG. 2). The heat is to be supplied to the cycle from point 7 to point 1. Such a cycle could provide a perfect match to a heat source the power of which is being delivered over a temperature range between $T_7+T$ to $T_1+T$, where T is the temperature difference between the coolant of the heat source and the LM of the PCS (where these fluids are not the same ones).

A large variety of alternative schemes of LMMHD PCSs which possess part or all of the unique characteristics of the PCS illustrated in FIGS. 1 and 2, and discussed above, are conceivable. Following is a description of few of these alternatives, all being mixer- and separator-less, as well as operating in the wet-vapor regime.

Rather than providing the working fluid exiting from the heat source in a saturated liquid state (Point 1 in the T-S diagram of FIG. 2), it is possible to have the working fluid partially boil by the heat source, thus producing the doubly trapezoidal cycle of FIG. 3. Alternatively, it is possible to heat the working fluid to subsaturation temperature and cause it to partially boil off by "flashing" in the flash nozzle.

Shown in FIG. 1 is an MHD generator of a divergent channel geometry. Instead, it might be possible to use MHD generators of other geometries, such as a disk-like generator which enables expanding the two-phase fluid over a wide vapor volume fraction domain in a relatively small device.

The single-phase MHD generator 14 shown in FIG. 1 is aimed at recovering a fraction of the pressure of the liquid metal after it exits from the LIQDIF 10. This generator is optional; in case it is not used, it will be necessary to provide some other means for controlling the proportioning of the liquid metal stream exiting from the LIQDIF 10 to the two streams of the cycle (see FIG. 1).

It is possible to combine a number of LMMHD PCSs of the type shown in FIG. 1 in series, thus extending the pressure-temperature domain covered by the cycle. FIG. 4 shows, by way of example, a two-stage PCS. In the particular arrangement shown, the working fluid velocity in the first stage is relatively low, as no nozzle is used between the TPMHDGEN 6 and the JETCON 8. The fluid enters the second TPMHDGEN 6' in close to a saturated liquid state. Although FIG. 4 shows that subcooling of the liquid exiting from the first diffuser 10 is accomplished in a regenerative heat exchanger 24, it might be desirable to do some additional subcooling in a heat sink. Also, it might be advantageous to locate the liquid diffuser 10 upstream of the splitter 12 rather than downstream thereof as shown in FIG. 4, and to add a nozzle upstream of the second MHD generator 6'.

In a further elaboration including the above relocation of liquid diffuser 10 and the addition of a flashing nozzle 4' upstream of the second MHD generator 6', the regenerative heat exchanger 24 is altogether dispensed with, liquid metal for introduction into the first-stage jet condenser 8 being taken from the second-stage splitter 12'. Also dispensed with is the first-stage liquid diffuser 10, the output of the first-stage jet condenser 8 being led from the first-stage splitter 12, on the one hand, back to the heat source 2 and, on the other, to the added flashing nozzle 4' of the second stage. Depending on the pressures prevailing in the respective return branches of the two stages (first-stage slitter 12 to heat source 2, and second-stage splitter 12' to first-stage liquid nozzle 18), these branches can be provided with an MHD or any other type of pump, or an MHD generator, or can remain without either. This method of coupling of two stages has an advantage over that illustrated in FIG. 4, in that, having no regenerative heat exchanger, there will be no exergy losses caused by such heat exchangers, and size as well as weight will be significantly reduced.

Another embodiment of this cycle is shown in FIG. 5. Here the working fluid is heated before entering the second TPMHDGEN 6', to provide any desirable inlet vapor volume fraction. While in the embodiment of FIG. 4 the temperature change of the working fluid across the heat source substantially equals the temperature change of the working fluid across the first stage only, in the embodiment of FIG. 5 the temperature change across the heat source is the sum of the temperature changes accumulated across the two stages.

When the number of stages exceeds two, the heat rejected by higher-pressure stages may serve as heat sources to lower-pressure stages, where the low-pressure stage is at least two stages preceding the higher-pressure heat source stage. Thus regenerative heat exchangers between stages may replace corresponding reject and energy-source heat exchangers.

FIG. 6 shows an alternative way of coupling two LMMHD modules in series. Here the coupling is indirect, with the heat sink 10 for the first module providing the heat source for the second module. The temperature change of the working fluid across the heat source is the temperature change of the working fluid across the first odule only. This PCS arrangement facilitates the use of different working fluids in the different modules and, thus, optimization of pressure in each module.

FIG. 7 is a schematic illustration of a dual-stage LMMHD PCS in which partial condensation of the two-phase fluid between the exit of one LMMHD generator and entrance to the following LMMHD generator is accomplished by a jet-condenser. The high pressure of the cycle is restored using MHD pumps 20.

FIG. 8 shows a similar cycle, to which there is added another jet condenser 8' the function of which is to completely condense the two-phase fluid before it enters the heat-sink heat-exchanger 16, thus reducing the heat-exchanger size (and weight), and facilitating heat transfer.

While all the LMMHD PCSs considered so far use a jet condenser, a nozzle and a diffuser, it might be possible to approach the performance of these PCSs using more conventional components. Following are a number of examples.

FIG. 9 is a schematic illustration of a dual-module LMMHD PCS which uses a regenerative heat exchanger 24 (REGHX) to partially condense the vapor of the two-phase mixture coming out of the first TPMHDGEN 6, so as to reduce the vapor volume fraction to the level desirable for the inlet to the following TPMHDGEN 6' (approximately 0.5). Whereas the system of FIG. 9 uses an MHD pump 20 (MHDPMP) for restoring the cycle high pressure, a nozzle-condenser-diffuser could have been used as well.

FIG. 10 is a schematic illustration of a dual-module LMMHD PCS, in which the heat sink 16 for a given stage serves as heat source 2' for the following stage. The working fluid of each of the modules can be selected independently, so as to optimally match the temperature domain of each stage. In turn, some exergy loss is associated with the temperature difference between the two working fluids which interact in the heat exchanger (HX) 26.

Rather than using an elemental liquid metal (such as Hg or Cs) for the working fluid, it is possible to use a mixture or a solution of two (or more) liquid metals. By changing the relative concentration of the constituents of the resulting composite liquid metal it is possible to adjust the vapor pressure to the specific temperature domain of each of the PCS stages, so as to optimize the performance and to minimize the cost of the multi-stage LMMHD PCS. Thus, for example, whereas Hg appears to be the preferred LM in the temperature range below about 900° C. (at which temperature the Hg vapor pressure is of the order of 200 bars—about the upper practical limit), a Hg-Cs or Hg-K composite may be the most desirable working fluid to use at higher temperature.

Instead of using a single-component fluid for the PCS, it is possible to design the systems described above to operate with a two-component fluid—a carrier (having a relatively low vapor pressure) and a volatile (having a relatively high vapor pressure). In this two-component fluid system the volatile material is permitted to boil off only partially, so that the cycle operates in the wet-vapor regime (in contrast to the prior-art two-component fluid LMMHD cycles, in which all the volatile substance is allowed to boil off, and the cycle operates in the superheated vapor regime).

By selecting the carrier to be a liquid metal of a low volumetric heat capacity relative to the volumetric heat capacity of the volatile material, it might be possible to design a LMMHD PCS to operate over a larger temperature range and, hence, have a higher efficiency than possible with a single-component PCS. This is due to a number of factors:

(a) The amount of energy required to evaporate a given mass of the volatile material is independent of the type of the carrier substance. Since a large fraction of the evaporation energy comes from the carrier substance, the lower the volumetric heat capacity of the carrier, the larger the temperature required for bringing about the evaporation of a given mass of the volatile substance.

(b) The lower the low cycle temperature, the larger the mass of volatile material that must be evaporated for attaining a given vapor volume fraction at the end of the expansion process. The larger the mass of the volatile that must be evaporated, the larger must be the temperature drop of the carrier substance.

An example for a two-component fluid system offering the above described property is a potassium-mercury system, the volumetric heat capacity of potassium being only about a quarter that of mercury.

The carrier must be a liquid metal (i.e., a conductive fluid), while the volatile can be either a liquid-metal or non-conductive fluid (such as an organic fluid or even water). In the PCS according to the present invention, operation of the two-component fluid, however, differs from the operation of a two-component fluid in prior-art LMMHD PCSs in that the volatile fluid is here maintained in a saturation state (rather than in the superheated state generally proposed by prior-art PCSs).

Using a two-component fluid, it is possible to apply the LMMHD PCS described above to the medium-and low-temperature range as well as to the high and very high temperature domain originally proposed. The temperature range accessible is determined by the volatile fluid used.

While the LMMHD PCSs operating in the superheated vapor regime are characterized by isothermal expansion and constitute a good match to a heat source delivering its energy over a narrow temperature range, the LMMHD PCSs operating in the wet-vapor regime described make a favorable match to heat sources characterized by energy delivery over the entire temperature range of the cycle.

FIG. 11 compares, schematically, the temperature dependence of heat delivery from a heat source characterized by strong temperature dependence, to the working fluid of several power conversion cycles a, b, c. The shaded area between the heat source (HS) and power conversion system fluid (PC) temperature profiles indicates exergy loss; the larger the area, the larger is the loss in the ideal efficiency of the cycle (and therefore, also in the actual efficiency attainable). It is observed that the "wet vapor" LMMHD PCS is characterized by a minimum exergy loss.

While the LMMHD PCSs described above can operate as stand-alone cycles, they can also function as topping cycles. The stand-alone mode of operation appears particularly useful for space applications as well as for special, unattended terrestrial applications. The topping cycle mode of operation, on the other hand, is attractive for terrestrial applications characterized by a high-temperature heat source, in which a significant fraction of the heat source power is provided at temperatures above those allowable in present stream Rankine cycle technology (i.e., above about 550° C.).

FIG. 12 illustrates the favorable match the "wet-vapor" LMMHD PCSs according to the invention can make with the temperature dependence of the heat source requirement of typical Rankine bottoming cycles, a and b.

It should be pointed out again that the two-phase MHD generators used in the various embodiments of the present invention are of the "flashing" type, i.e., of the type in which, due to dropping pressure, the still liquid component of the working fluid continues to boil and produce vapor, in contradistinction to the MHD generators used in prior-art cycles in which the working fluid, while passing through these generators, is either fully in the liquid phase (single-phase MHD generators) or is a mixture of a liquid and superheated vapors (conventional two-phase MHD generators).

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for wet-vapor, liquid-metal magnetohydrodynamic power conversion, comprising, in a cyclic process:

partially boiling off, using at least a heat source, an electrically conductive, substantially single-phase working liquid, thus generating vapors which, together with the still liquid phase, produce a two-phase mixture;

extracting electric power by passing said two-phase mixture through a two-phase MHD generator;

causing the vapor phase of said two-phase mixture from said MHD generator to condense, by mixing in a condenser the two-phase stream exiting from said MHD generator with a stream of subcooled liquid metal;

splitting said liquid exiting said condenser into a first part and a second part;

returning said first part to said heat source to be reheated;

subcooling said second part by passing it through a heat-exchanging means;

accelerating said subcooled liquid metal to substantially match the velocity of said two-phase mixture in said condenser, and introducing said accelerated and subcooled iquid metal into said condenser to effect said condensing action.

2. The method as claimed in claim 1, comprising the further step of increasing the velocity and reducing the pressure of said working liquid by passing it through a first flash nozzle after having left said heat source and before entering said two-phase MHD generator.

3. The method as claimed in claim 1, comprising the further steps of increasing the vapor volume fraction and velocity of said two-phase mixture by passing it through a second flash nozzle after having left said two-phase MHD generator and before entering said condenser, and reducing the velocity, while building up the pressure of the substantially single-phase liquid metal exiting said condenser by passing said liquid metal through a liquid diffuser.

4. The method as claimed in claim 1, wherein condensing the vapor phase of said two-phase mixture is effected in a jet condenser in which said two-phase stream exiting from said MHD generator is mixed with a stream of sub-cooled liquid metal having a velocity and flowing in a direction substantially identical to the velocity and flow direction of said two-phase stream.

5. The method as claimed in claim 1, comprising the further step of controlling the pressure of said first part of said liquid on its way back to said heat source by passing it through a single-phase MHD generator.

6. The method as claimed in claim 1, wherein, prior to being returned to said heat source, said first part is introduced into an additional stage.

7. The method as claimed in claim 6, comprising the further step of leading part of the liquid metal exiting the condenser of said second stage back to the first stage, and introducing said led-back liquid metal into said first-stage condenser.

8. The method as claimed in claim 6, comprising the further step of heating said first part in a heat source prior to introducing it into said additional stage.

9. The method as claimed in claim 1, comprising the further step of coupling to said cyclic process an additional module thereof, having a separate working liquid, heating of said separate working liquid being effected by passing said separate liquid through the heat-drawing section of said heat exchanging means of the first module of said cyclic process.

10. A method for wet-vapor, liquid-metal magnetohydrodynamic power conversion, comprising, in a cyclic process:
    partially boiling off, using at least a heat source, an electrically conductive, substantially single-phase liquid, thus generating vapors which, together with the still liquid phase, produce a two-phase mixture;
    extracting electric power by passing said two-phase mixture through a first two-phase MHD generator;
    causing the vapor phase of said two-phase mixture to partially condense by mixing, in a condenser, the two-phase mixture exiting from said MHD generator with a stream of subcooled liquid;
    extracting electric power by passing the partially condensed two-phase mixture through a second two-phase MHD generator;
    finally and fully condensing the vapor phase of the two-phase mixture exiting from said second MHD generator by passing it through a heat-exchanging means;
    splitting the subcooled single-phase liquid exiting said heat-exchanging means into a first part and a second part;
    returning said first part to said heat source to be reheated;
    accelerating said second part by passsing it through an accelerating means, and
    introducing said accelerated and subcooled liquid metal into said condenser to effect said partial condensing action.

11. The method as claimed in claim 10, comprising the further step of increasing the pressure of said first part of said single-phase liquid by passing it through at least one MHD pump, prior to its return to said heat source.

12. The method as claimed in claim 10, wherein said partially condensed vapor phase of said two-phase mixture exiting from said second two-phase MHD generator is finally and fully condensed in a second condenser interposed between said second MHD generator and said heat-exchanging means, said condensing action being effected by a subcooled stream of liquid metal split off said returning first part and passing through a second accelerating means.

13. A method for wet-vapor, liquid-metal magnetohydrodynamic power conversion, comprising, in a cyclic process:
    partially boiling off, using at least a heat source, an electrically conductive, substantially single-phase working liquid, thus generating vapors which, together with the still liquid phase, produce a two-phase mixture;
    extracting electric power by passing said two-phase mixture through a first two-phase MHD generator;
    causing the vapor phase of said two-phase mixture from said MHD generator to partially condense by passing said mixture through a regenerative heat exchanger;
    extracting electric power by passing said partially condensed two-phase mixture exiting from said regenerative heat exchanger through a second two-phase MHD generator,
    finally and fully condensing the vapor phase of said two-phase mixture by passing it through a heat sink, and
    returning the subcooled single-phase liquid exiting from said heat sink to said heat source via said regenerative heat exchanger to exchange heat with said two-phase mixture to be partially condensed therein.

14. A method for wet-vapor liquid-metal magnetohydrodynamic power conversion, comprising, in a cyclic process:
    partially boiling off, using at least a heat source in a first module, an electrically conductive, substantially singlephase working liquid, thus generating vapors which, together with the still liquid phase, produce a two-phase mixture;
    extracting electric power by passing said two-phase mixture through a two-phase MHD generator;
    causing the vapor phase of said two-phase mixture exiting from said MHD generator to condense, by passing said mixture through a heat sink,
    returning the single-phase liquid exiting from said heat sink to said heat source, and
    coupling to said cyclic process a second module, having a separate working liquid, heating of said separate working liquid being effected by passing said separate liquid through a heat exchanger constituted by the heat sink of the first module of said cyclic process.

15. A system for wet-vapor, liquid-metal magnetohydrodynamic power conversion, comprising:
    a heat source for converting an electrically conductive, substantially single-phase working liquid into a two-phase mixture;
    a two-phase MHD generator for extracting electric power from said two-phase mixture;
    a condenser for condensing the vapor phase of said two-phase mixture from said MHD generator;
    a splitter for dividing the liquid metal exiting from said condenser into a first and a second part;
    a heat-exchanging means for subcooling said second part, and
    means for accelerating said subcooled liquid metal prior to its introduction into said condenser.

16. The system as claimed in claim 15, further comprising a flash nozzle interposed between said heat source and said two-phase MHD generator.

17. The system as claimed in claim 15, further comprising a second flash nozzle interposed between said two-phase MHD generator and said condenser, and a liquid diffuser interposed between said condenser and said splitter.

18. The system as claimed in claim 15, wherein said condenser is a jet condenser in which said two-phase mixture and said subcooled liquid metal move and make direct contact at substantially equal velocities in a substantially identical direction.

19. The system as claimed in claim 15, wherein said means for accelerating is a liquid nozzle.

20. The system as claimed in claim 15, further comprising a single-phase MHD generator interposed between said splitter and said heat source.

21. The system as claimed in claim 15, further comprising, connected in series, a second stage, said heat source providing heat for both stages.

22. The system as claimed in claim 15, further comprising, connected in series, a second module, heating of said second module being effected at a point downstream of the splitter of the first module.

23. The system as claimed in claim 15, further comprising a second module with a separate working-fluid cycle, the heat source of said second module being constituted by the heat-exchanging means of the first module.

24. A system for wet-vapor, liquid-metal magnetohydrodynamic power conversion, comprising:
- a heat source for converting an electrically conductive, substantially single-phase working liquid into a two-phase mixture;
- a two-phase MHD generator for extracting electric power from said two-phase mixture;
- a condenser for partially condensing the vapor phase of said two-phase mixture exiting from said MHD generator;
- a second two-phase generator for extracting electric power from said partially condensed two-phase mixture;
- a heat-exchanging means for finally and fully condensing and subcooling the partially condensed two-phase mixture exiting from said second MHD generator, and
- a splitter for dividing the liquid metal exiting from said heat-exchanging means into a first and a second part.

25. The system as claimed in claim 24, wherein said condenser is a jet condenser in which said two-phase mixture and said subcooled liquid metal move and make direct contact at substantially equal velocities in a substantially identical direction.

26. The system as claimed in claim 24, further comprising at least one MHD pump located between said heat-exchanging means and said heat source, as well as a liquid nozzle located between said splitter and said condenser.

27. The system as claimed in claim 24, further comprising a second condenser interposed between said second two-phase MHD generator and said heat-exchanging means, and a second liquid nozzle for supplying said second condenser with subcooled liquid metal.

28. A system for wet-vapor, liquid-metal magnetohydrodynamic power-conversion, comprising:
- a heat source for converting an electrically conductive, substantially single-phase working liquid into a two-phase mixture;
- a first two-phase MHD generator for extracting electric power from said two-phase mixture;
- a heat regenerative exchanger for partially condensing the vapor phase of said two-phase mixture exiting from said first MHD generator;
- a second two-phase MHD generator located downstream of said regenerative heat exchanger, and
- a heat sink for finally and fully condensing the vapor phase of said two-phase mixture, from which heat sink the single-phase liquid metal exiting therefrom is returned via said regenerative heat exchanger to said heat source.

29. The system as claimed in claim 28 further comprising at least one single-phase MHD pump located between said heat sink and said regenerative heat exchanger.

30. The system as claimed in claim 28 further comprising at least one flash nozzle, located between said heat source and said first two-phase MHD generator.

31. A system for wet-vapor liquid-metal magnetohydrodynamic power conversion, comprisng
- a heat source for converting an electrically conductive, substantially single-phase working liquid into a two-phase mixture;
- a two-phase MHD generator for extracting electric power from said two-phase mixture;
- a heat sink for condensing the vapor phase of said two-phase mixture exiting from said MHD generator, from which heat sink the single-phase liquid metal exiting therefrom is returned to said heat source, said heat source, said two-phase MHD generator and said heat sink constituting a first module; and
- a second heat source, a second two-phase MHD generator and a second heat sink, together constituting a second module having a separate working liquid, wherein heating of said separate working liquid is effected by passing it through a heat exchanger constituted by the heat sink of said first module.

32. The system as claimed in claim 31, further comprising a flash nozzle interposed between said heat source and said MHD generator in at least one of said modules.

33. The system as claimed in claim 31, further comprising a single-phase MHD pump located between said heat sink and said heat source in at least one of said modules.

34. The system as claimed in claim 32, further comprising a second flash nozzle interposed between said heat source and said MHD generator in another one of said modules.

35. The system as claimed in claim 33, further comprising a second single-phase MHD pump located between said heat sink and said heat source in another one of said modules.

* * * * *